United States Patent Office 2,805,209
Patented Sept. 3, 1957

2,805,209

DRY PROCESS RESINIFIED CONSOLIDATED PRODUCT OF PHENOL FORMALDEHYDE AND CELLULOSE

Albert H. Bowen and Jacob R. Ash, Seattle, Wash., assignors to Monsanto Chemical Company, St. Louis, Mo., a corporation of Delaware No Drawing. Application April 13, 1953,
Serial No. 348,556

4 Claims. (Cl. 260—17.2)

This invention relates to a new and improved dry-process resinified consolidated product from alpha-cellulose containing fibrous bodies and to the process for making same.

Heretofore in the preparation of a dry-process consolidated product, such as hardboard, it has been proposed to mix a dry or relatively dry alpha-cellulose containing fibrous bodies and a thermosetting resin, then to form the mixture while dry or substantially dry into a felted mat, and thereafter to subject the dry or substantially dry felted mat to a consolidating heat and pressure. However, for one or more reasons the consolidated products obtained by such a process have not been found entirely satisfactory but in that the dry-process has many advantages over the well-known wet- and damp-processes the art has constantly sought improvements.

In accordance with this invention it has been found that a substantially improved resinified consolidated product from alpha-cellulose containing fibrous bodies can be prepared in accordance with the dry process by subjecting to a consolidating temperature and pressure a mixture comprising a preformed water-soluble thermosetting resin defined hereinafter with a dry or relatively dry alpha-cellulose containing fibrous body and free phenol in such proportions that the water content of the mass to be consolidated does not exceed about 10% by weight of the bone-dry fibrous content. The consolidated products so obtained are characterized by excellent flexural strength and improved water-resisting properties.

By alpha-cellulose containing fibrous bodies is meant to include all forms of pure or substantially pure alpha-cellulose and the ligno-cellulosic fibrous bodies derived from deciduous and coniferous trees or from plants other than trees. The type of alpha-cellulose containing fibrous body used in the process of this invention differs in no manner from that used in other dry processes and includes shavings from planers, fibers, sawdust from various sawing operations, etc. Ligno-cellulosic fibers are preferred in the present process and in the preparation of a suitable ligno-cellulosic fiber from soft woods or hard woods, the wood chips after being screened are steamed or cooked under pressure in order to soften them and then they are passed through a mechanical shredder or defiberizer, which shredder or defiberizer will vary according to the species of wood to be ground and the class of fiber desired. After preparation this preferred fibrous product usually contains moisture in an amount substantially less than that occurring in the ligno-cellulosic material in its naturally occurring state. If the residual moisture in the resultant shredded product is too large for dry-process consolidation the fibers are then subjected to a drying operation to reduce the moisture content to a predetermined amount below about 10% by weight. In instances wherein a wax sizing agent is to be used it is ordinarily added before the chips are cooked or ground.

The water-soluble thermosetting resins of this invention are prepared by reacting under alkaline conditions phenol and formaldehyde in the presence of an inorganic alkaline catalyst such as sodium hydroxide, potassium hydroxide, sodium carbonate, etc., for accelerating the formation of the resin condensation product on heating. The water-soluble thermosetting resins of this invention usually have a pH above about 9.8 and may be prepared by a number of methods, as for example by the one-stage process of C. F. Van Epps, U. S. 2,360,376 or the multi-stage processes of J. T. Stephan, U. S. 2,437,981, and D. V. Redfern, U. S. 2,457,493. In general employing the one-stage process or the multi-stage process in the preparation of the thermosetting resins of this invention, the molar ratio of phenol to formaldehyde is in the range of 1:1.9–2.25 and the molar ratio of phenol to alkaline catalyst expressed as sodium hydroxide is in the range of 1:0.18–0.85. The preferred molar ratio is approximately 1 mol of phenol to approximately 2 mols of formaldehyde to approximately 0.25 mole of alkaline catalyst expressed as sodium hydroxide.

The aforedescribed resins are characterized by high reactivity as measured by the "dry-rubber" test for speed of setting. In this test six drops of the aqueous resin solution are dripped onto a sheet of stainless steel held at a constant temperature of 300° F. The resin sample is worked with a stiff spatula over a small area until a dry, rubbery stage is reached. The thermosetting resins of the present invention require from about 12 to about 28 seconds to change from the liquid to the dry, rubbery state.

It is preferred to employ the thermosetting resin in the form of an aqueous solution, e. g. a 30–70% aqueous solution, however, where desired the thermosetting resin can be employed in the form of a dry solid powder. In general the amount of thermosetting resin employed will be in the range from about 0.5 to about 5% resin solids based upon the bone-dry weight of the fibrous material. It is to be understood, however, that greater or lesser amounts may be employed depending upon the particular fibrous body, conditions of consolidation such as temperature and pressure, as well as the type of consolidated product desired.

Although pure phenol is preferred in the process of this invention, crude phenol such as that containing miscible amounts of water may be employed. Commercial grade phenol (80–82% phenol) which contains minor amounts of lower alkyl phenols can also be employed.

Ordinarily the preformed resin, if it be employed in the form of a solution is admixed with the fibrous body by spraying the former and blowing the latter into a common volume of air under conditions to produce a well mixed air suspension of fiber and resin solution and thereto add, as for example by spraying, free phenol. The free phenol may be added in conjunction with the resin solution if so desired, the phenol being mixed with the resin prior to the spraying or other mixing operation. If it be preferred to employ the preformed resin as a solid it may be admixed in powder form in a solid mixer with the fibrous material, the free phenol being suitably admixed thereafter. In such instances if desired a small amount of water may be added, provided the total water content does not exceed about 10% by weight of the bone-dry fiber content. In general any device or means which will effect an intimate mix of phenol, fiber and resin may be used.

As illustrative of the preferred resin of this invention is the following:

*Example I*

To a suitable reaction vessel is added approximately 260 parts by weight of phenol, approximately 450 parts by weight of formalin (37% $CH_2O$ by weight), approximately 55.3 parts by weight of a 50% by weight aqueous solution of sodium hydroxide and approximately 235 parts by weight of water. The mix so obtained is refluxed for about 30 minutes and then is quickly cooled. The homogeneous product exhibits a viscosity of about 475 centipoises, a pH of about 9.9, and a solids content of about 37% by weight. The molar ratio of phenol to formaldehyde to sodium hydroxide is 1:2:0.25. This solution will be hereafter referred to as a 37% by weight thermosetting resin solution.

As illustrative of the process of this invention and the improved consolidated product obtained, several preparations are made employing the following process and ingredients tabulated below with the accompanying results.

Into a suitable dry-process blender is blown approximately 3700 parts by weight of a ligno-cellulosic fibrous body produced by suitable devices acting on Douglas fir wood containing approximately 3420 parts by weight bone-dry fiber intimately mixed with approximately 90 parts by weight of a wax sizing agent. Into this mixture is sprayed free phenol (amounts of which are set forth below) and 186 parts by weight of the 37% by weight thermosetting resin of Example I to effect a well mixed air suspension of fiber, resin and free phenol which mixture contains about 9.8% by weight moisture. The mix so obtained is discharged from the blender and fed directly to a felting machine. The floor of the felting machine is a moving belt on which the fibers fall and form a mat, which mat as it emerges from the felting chamber is 6 to 7 inches thick. This mat is then cold-pressed to about 2 inches. A ⅛-inch board is then prepared by hot pressing the mat for 1 minute at 750 p. s. i. followed by 9 minutes at 250 p. s. i., the press platen temperature being 340° F. Upon cooling to room temperature the panel is sawn into test pieces and conditioned at 50% relative humidity and 70° F. for seven days. The water absorption characteristics of the process were made according to the Forest Products Laboratory Bulletin R–1712, as revised, May 1949, while the flexural strength characteristics were made according to normal industrial testing procedure.

| Added Free phenol (parts by weight per 100 parts by weight of 37% thermosetting resin of Example I) | Percent Water pick-up | Modulus of Rupture (lbs.) |
|---|---|---|
| 0 | 20.5 | 6,750 |
| 1 | 19.4 | 6,950 |
| 5 | 17.5 | 7,475 |
| 10 | 16.7 | 7,750 |

In contrast to the foregoing it was observed that the improvement in water resistance and flexural strength sharply fell off in instances wherein the resin-fibrous body-free phenol mass to be consolidated possessed a moisture content in excess of 10% by weight based upon the bone-dry fibrous content. Employing the same weight proportions as above of free phenol, thermosetting resin of Example I, and dry weight of the alpha-cellulose containing fibrous body of the foregoing illustration but preparing a felted mat in accordance with the damp process, i. e. forming a composite of resin, phenol and alpha-cellulose containing body containing about 40% by weight moisture based upon bone dry fibrous body, and consolidating same in accordance with accepted practice, no improvement in water resistance or flexural strength was observed over the blank, i. e. the consolidated product obtained wherein no free phenol was employed.

The amount of free phenol admixed with the alpha-cellulose containing fibrous body and thermosetting resin in accordance with the process of this invention may vary widely depending upon the fibrous body, the particular resin, the type of consolidated product desired, etc. In general, however, the amount of free phenol employed will be in the range of from about 2 to about 30 parts by weight per 100 parts by weight of resin solids of the thermosetting resin. It is preferred to employ amounts in the range of from about 8 to about 15 parts by weight per 100 parts resin solids of the thermosetting resin. It is to be understood by free phenol that such excludes the unreacted phenol (if such be present) of the thermosetting resins of the process of this invention. In general the thermosetting resins of this invention will be substantially free of unreacted phenol, however, some do contain as much as 1.5% by weight based upon the total resin solids and it is to be understood that the present invention contemplates such resins. While many thermosetting resins can be made which contain a substantial amount of unreacted phenol, as for example 2–25% by weight, such resins are not contemplated by the process of this invention. This latter type of resin can only be made if the formaldehyde is held below about 1.4 mols per mol of phenol, and the resins so produced are characterized by lack of reactivity as indicated by the dry-rubber test. For example, a resin having a mol ratio of 1.0:1.33, phenol to formaldehyde, and having an unreacted phenol content of about 21% will have a dry-rubber time of about 380 seconds. In contrast, the resin of Example I without added phenol has a dry-rubber time of about 22 seconds, this time being slightly increased by the addition of free phenol until, at a free phenol content of about 21%, the dry-rubber time is about 28 seconds.

The present invention is primarily concerned with making hardboard, although the process can be employed for making any consolidated product of lesser density. In making hardboard in accordance with the present process it is preferred to employ consolidating temperatures in the range of about 290° F. to 340° F. and an initial consolidation pressure of 500 to 1000 p. s. i. for a period of 30 seconds to 2 minutes, and finishing the consolidation at a pressure of 50 to 500 p. s. i. over a period of about 3 to 10 minutes. It is to be understood, however, that in making a consolidated product any combination of consolidating temperature and pressure is contemplated.

Although the present invention has been described with respect to certain embodiments, it is not so limited and it is to be understood that variations and modifications obvious to one skilled in the art may be made without departing from the spirit or scope of this invention.

What is claimed is:

1. The process of producing a consolidated product which comprises admixing an alpha-cellulose containing fibrous body, free phenol, and an aqueous solution of a preformed alkaline condensed thermosetting resin condensation product of phenol and formaldehyde, which aqueous resin solution possesses a pH above about 9.8 and requires from about 12 to about 28 seconds to change from the liquid to the dry-rubbery state as measured by the dry-rubber test at 300° F. for speed of setting, the total amount of water present in the mixture so produced being no more than about 10% by weight based upon the bone-dry fibrous content, and consolidating same by subjecting the mixture at a temperature of 290–340° F. at a pressure of from 500–1000 p. s. i. for from 30 seconds to 2 minutes followed by further consolidation at a pressure of 5–500 p. s. i. for from 3–10 minutes at 290–340° F., the quantity of said free phenol being about 2–30 parts by weight per 100 parts thermosetting resin solids, the said thermosetting resin being the water-soluble condensation product obtained upon reacting phenol and formaldehyde in the presence of an alkaline catalyst in a molar ratio of about 1 mol product to about 1.9–2.25 mols of formaldehyde to about 0.18–0.85 mol alkaline catalyst expressed as sodium hydroxide, the thermosetting resin so produced being further characterized by containing not more than about 1.5% by weight based upon the thermosetting resin solids of unreacted phenol.

2. The process of producing a consolidated product which comprises admixing a ligno-cellulosic fibrous body, free phenol, and an aqueous solution of an alkaline condensed thermosetting resin condensation product of phenol and formaldehyde in the proportion of about 0.5 to 5% resin solids based on the weight of bone-dry fibrous content, which aqueous resin solution possesses a pH above about 9.8 and requires from about 12 to about 28 seconds to change from the liquid to the dry-rubbery state as measured by the dry-rubber test at 300° F. for speed of setting, the total amount of water present in the mixture so produced being no more than about 10% by weight based on the weight of bone-dry fibrous content, and consolidating same by subjecting the mixture at a temperature of 290–340° F. at a pressure of from 500–1000 p. s. i. for from 30 seconds to 2 minutes followed by further consolidation at a pressure of 50–500 p. s. i. for from 3–10 minutes at 290–340° F., the quantity of said free phenol being about 2–30 parts by weight per 100 parts thermosetting resin solids, the said thermosetting resin being the water-soluble condensation product obtained upon reacting phenol and formaldehyde in the presence of sodium hydroxide in a molar ratio of about 1 mol phenol to about 2.0 mols of formaldehyde to about 0.25 mol of sodium hydroxide, the said thermosetting resin being further characterized by containing not more than about 1.5% unreacted phenol based upon the thermosetting resin solids.

3. The process of producing a consolidated product which comprises admixing fibers of a lignocellulosic fibrous body, free phenol, and an aqueous soltuion of an alkaline condensed thermosetting resin condensation product of phenol and formaldehyde in the proportion of about 0.5 to 5% resin solids based on the weight of bone-dry fiber, which aqueous resin solution possesses a pH above about 9.8 and requires from about 12 to about 28 seconds to change from the liquid to the dry-rubbery state as measured by the dry-rubber test at 300° F. for speed of setting, the total amount of water present in the mixture so produced being no more than about 10% by weight based on the weight of bone-dry fiber, and consolidating same by subjecting the mixture at a temperature of 290–340° F. at a pressure of from 500–1000 p. s. i. for from 3 seconds to 2 minutes followed by further consolidation at a pressure of 50–500 p. s. i. for from 3–10 minutes at 290–340° F., the quantity of said free phenol being about 8–15 parts by weight per 100 parts of the resin solids of said thermosetting resin, the said thermosetting resin being the water-soluble condensation product obtained upon reacting phenol and formaldehyde in the presence of sodium hydroxide in a molar ratio of about 1 mol phenol to about 2.0 mols of formaldehyde to about 0.25 mol of sodium hydroxide, said thermosetting resin being further characterized by being substantially free of unreacted phenol.

4. The consolidated product of the process of claim 1.

References Cited in the file of this patent
UNITED STATES PATENTS

| | | |
|---|---|---|
| 949,671 | Baekeland | Feb. 15, 1910 |
| 1,146,214 | Townsend | July 13, 1915 |
| 1,776,202 | Strafford et al. | Sept. 16, 1930 |
| 1,998,211 | Van de Ven | Apr. 16, 1935 |
| 2,610,138 | Heritage | Sept. 9, 1952 |
| 2,631,097 | Redfern | Mar. 10, 1953 |
| 2,647,091 | McColgan | July 28, 1953 |

UNITED STATES PATENT OFFICE

CERTIFICATE OF CORRECTION

September 3, 1957

Patent No. 2,805,209

Albert H. Bowen et al.

It is hereby certified that error appears in the printed specification of the above numbered patent requiring correction and that the said Letters Patent should read as corrected below.

Column 4, line 61, for "5-500" read -- 50-500 --; line 68, for "product" read -- phenol --; column 6, line 9, for "3 seconds" read -- 30 seconds --.

Signed and sealed this 5th day of November 1957.

(SEAL)

Attest:
KARL H. AXLINE
Attesting Officer

ROBERT C. WATSON
Commissioner of Patents